United States Patent
Zhang et al.

(10) Patent No.: US 8,891,916 B2
(45) Date of Patent: Nov. 18, 2014

(54) SURFACE-PLASMON-POLARITONS TUNABLE OPTICAL RESONANT RING FILTER

(75) Inventors: Tong Zhang, Jiangsu (CN); Xiaoyang Zhang, Jiangsu (CN); Pengqin Wu, Jiangsu (CN); Jianguo Chen, Jiangsu (CN)

(73) Assignee: Southeast University, Jiangsu (CN)

( * ) Notice: Subject to any disclaimer, the term of this patent is extended or adjusted under 35 U.S.C. 154(b) by 354 days.

(21) Appl. No.: 13/123,257

(22) PCT Filed: Sep. 18, 2009

(86) PCT No.: PCT/CN2009/074033
§ 371 (c)(1),
(2), (4) Date: Jul. 5, 2011

(87) PCT Pub. No.: WO2010/040303
PCT Pub. Date: Apr. 15, 2010

(65) Prior Publication Data
US 2011/0274390 A1 Nov. 10, 2011

(30) Foreign Application Priority Data
Oct. 10, 2008 (CN) .......................... 2008 1 0155830

(51) Int. Cl.
*G02B 6/26* (2006.01)
*G02B 6/42* (2006.01)
*G02B 6/10* (2006.01)
*G02B 6/122* (2006.01)
*B82Y 20/00* (2011.01)

(52) U.S. Cl.
CPC .............. *G02B 6/1226* (2013.01); *B82Y 20/00* (2013.01)
USPC ................... 385/27; 385/32; 385/40; 385/48; 385/50; 385/129

(58) Field of Classification Search
USPC .............. 385/27, 1–3, 12, 32, 40, 48, 50, 129
See application file for complete search history.

(56) References Cited

U.S. PATENT DOCUMENTS 6,657,731 B2   12/2003   Tapalian et al.
6,834,141 B1   12/2004   Sidick
(Continued)

FOREIGN PATENT DOCUMENTS

CN          1460869 A       12/2003
CN        101403811 A        4/2009
WO   WO 2008/102511 A1 *    8/2008   .............. G02F 1/035

OTHER PUBLICATIONS

"Plasmonic waveguide ring resonator at terahertz frequencies", by Wang et al, Applied Physics Letters, vol. 89, pp. 133106-1 through 133106-3, 2006.*
"Wavelength selective nanophotonic components utilizing channel plasmon polaritons", by Volkov et al, Nano Letters, vol. 7, No. 4, pp. 880-884, 2007.*

(Continued)

*Primary Examiner* — Ryan Lepisto
*Assistant Examiner* — Robert Tavlykaev
(74) *Attorney, Agent, or Firm* — Patterson Thuente Pedersen, P.A.

(57) ABSTRACT

A surface-plasmon-polaritons (SPPs) tunable optical resonant ring filter that includes an SPPs waveguide, an SPPs tunable directional coupler, and an SPPs tunable resonant ring. The tunabilities of the resonant frequency, the resonant depth, and the filtering bandwidth are achieved by tuning the loss and transmission phase of the resonant ring and the coupling ratio of the directional coupler. Since the metal core layer of the SPPs waveguide is capable of multiplexing electro-optical signals, the SPPs tunable optical resonant ring filter can be used not only in an integrated optics system, but also in an integrated electro-optics hybrid system.

5 Claims, 4 Drawing Sheets

(56) References Cited

U.S. PATENT DOCUMENTS

| | | |
|---|---|---|
| 2003/0059147 A1* | 3/2003 | Berini .............................. 385/2 |
| 2003/0235367 A1 | 12/2003 | Yamazaki |
| 2005/0058425 A1* | 3/2005 | Berini et al. .................. 385/147 |
| 2007/0116420 A1* | 5/2007 | Estes et al. .................... 385/130 |
| 2007/0196065 A1 | 8/2007 | Lee et al. |
| 2008/0056660 A1 | 3/2008 | Lee et al. |
| 2008/0112713 A1 | 5/2008 | Guo |

OTHER PUBLICATIONS

"Silica-based finesse-variable ring resonator" by Kominato et al, IEEE Photonics Technology Letters, vol. 5, No. 5, pp. 560-562, 1993.*

"Handbook of Optical Constants of Solids: Handbook of Thermo-Optic Coefficients of Optical Materials with Applications", by Gorachand Ghosh, Academic Press, Chapter 3, 1998.*

\* cited by examiner

US 8,891,916 B2

SURFACE-PLASMON-POLARITONS TUNABLE OPTICAL RESONANT RING FILTER

PRIORITY CLAIM

The present application is a National Phase entry of PCT Application No. PCT/CN2009/074033, filed Sep. 18, 2009, which claims priority from Chinese Application 200810155830.6, filed Oct. 10, 2008, the disclosures of which are hereby incorporated by reference herein in their entirety.

FIELD OF THE INVENTION

The present invention relates to an implementation scheme for optical resonant ring filters in waveguide structures, in particular relates to a method for achieving tunable optical resonant ring filter with surface plasmon polaritons (SPPs) waveguide, applicable to the technical filed of integrated optics.

BACKGROUND OF THE INVENTION

As a complex functional device in integrated optics, an optical resonant ring filter is widely used in optical sensing and optical communication field, and is a core functional device in apparatuses and systems such as lasers, filters, amplifiers, optical switches, and optical delay lines, etc. At present, in the domain of integrated optics, a resonant ring mainly consists of an optical waveguide, and utilizes multiple-beam interferometry to produce a periodic transmitted spectrum and thereby forms a resonant ring filter. For a resonant ring filter, filtering bandwidth, resonance depth, and resonance frequency are crucial performance parameters, and usually the three above parameters must be continuously tunable so as to meet different functions and demands, wherein, the coupling ratio of coupler is related with resonance depth, the intra-ring transmission loss is related to filtering bandwidth, and the intra-ring transmission phase is related to resonance frequency. For a resonant ring in optical waveguide structure, a Mach-Zehnder coupler can be integrated in the ring to regulate the coupling ratio, so as to control the resonance depth; the intra-ring transmission phase can be regulated by means of the thermo-optical properties or electro-optical properties of the optical waveguide material, so as to control the peak value position of resonance frequency. Whereas, for an optical waveguide device, once the device is produced, its structural parameters are set, namely the intra-ring loss and the relevant resonance bandwidth are set and can't be adjusted continuously. Thus, it is difficult to produce a filter in a passive optical waveguide resonant ring structure which can control filtering bandwidth, resonance depth and resonance frequency accurately at the same time. To achieve tunable resonance bandwidth, a technical solution was provided to produce active optical waveguide resonant ring from Erbium-doped optical waveguide and utilize pump light to amplify the signal light and to reduce the intra-ring transmission loss and thereby reduce the resonance bandwidth and increase the definition of resonant ring. However, since such an optical waveguide resonant ring filter in an active structure requires introduction of both pump light and signal light, it increases crosstalk between signals, reduces stability of the devices, and can only modulate signals near 1550 nm waveband; in addition, it can't increase the intra-ring loss and achieve the function of increasing resonance bandwidth.

In recent years, as the nanometer optoelectronic technology progressed continuously, a brand-new waveguide structure—Surface Plasmon Polaritons (SPPs) waveguide became a new trend of research in the field of integrated optics. SPPs are electromagnetic modes produced by interaction between light waves and migratory surface charges (e.g., free electrons in metal), which can achieve transmission in a waveguide made of metal and dielectric materials in a specific structure. SPPs signals can be transmitted a long distance by optimizing the structural design of metal waveguide. The SPPs waveguide has many features that are not available in an optical waveguide, such as signal transmission at nanometer level, which is much lower than optical waveguide level; with the metal waveguide structure, not only optical signals but also electrical signals can be transmitted by SPPs waveguide, making opto-electronic hybrid systems possible; since the characteristics of SPPs mode depend on the refractive index of the dielectric material, the transmission characteristics in SPPs mode can be flexibly controlled by means of the electro-optical and thermo-optical properties of the dielectric material to achieve efficient and tunable SPPs waveguide devices, which is one of the major advantages of SPPs waveguide devices over optical waveguide devices. Various new functional devices based on SPPs waveguide, such as SPPs directional couplers, SPPs waveguide modulators, SPPs waveguide Mach-Zehnder couplers, and SPPs waveguide attenuators, are reported in related experiments, and can be applied in many fields such as optical communication and optical sensing systems, etc.

SUMMARY OF THE INVENTION

Technical problem: The objective of the present invention is to provide a SPPs tunable optical resonant ring filter, which can control three parameters, i.e., resonance depth, resonance frequency, and filtering bandwidth accurately at the same time by means of unique transmission characteristics of SPPs and a variety of regulating means.

Technical solution: The technical solution in the present invention is achieved as follows: the filter comprises an SPPs waveguide, SPPs tunable directional coupler, SPPs tunable resonant ring, and ring heaters; wherein, the resonant ring and its straight waveguide outside of the ring forms a coupler; the coupler and the resonant ring are made of SPPs waveguide respectively; the ring heater covers the resonant ring; straight wire gaps are symmetrically distributed on the SPPs waveguide, and arc-shaped wire gaps are symmetrically distributed on the resonant ring; a first electrode pin is arranged on the SPPs waveguide, a second electrode pin is arranged on the resonant ring, a third electrode pin and a fourth electrode pin are arranged on the ring heater.

The sandwich layer of the SPPs waveguide is made of metal nanometer wires, in thicknesses of 10-20 nm and widths of 1-8 μm; the top cladding and bottom cladding on/below the sandwich layer are made of an organic polymer dielectric material with a high thermo-optical coefficient, in thickness of 15μm respectively.

In the SPPs tunable directional coupler, the electrode pins and metal wire gaps are made in the sandwich layer of metal nanometer wires to form electrical signal transmission circuits.

In the SPPs tunable resonant ring, electrode pins and metal wire gaps are made in the sandwich layer of metal nanometer wires of the resonant ring to form electrical signal transmission circuits.

The ring heater that covers the resonant ring comprises a top metal strip carrier and a bottom metal strip carrier layer produced at outer side of the top cladding and bottom cladding, and it is in a split metal ring structure; wherein, the third electrode pin in the top cladding is not in the same plane as the fourth electrode pin in the bottom cladding.

In terms of structure, in a conventional integrated optical waveguide resonant ring filter, the core part is a resonator ring circuit formed by a passive or active optical waveguide, with light signals transmitted in the ring; such a resonant ring filter utilizes multiple-beam interferometry to form a ring filter with periodic filtering characteristics. The crucial technical indexes of a ring filter include resonance depth, resonance frequency, and filtering bandwidth. Likewise, in the SPPs tunable optical resonant ring filter, the transmission waveguide is made of metal nanometer wires and organic polymer dielectric material, and the transmission signals are in a mixed mode formed by optical signals and metal surface electron gas—namely SPPs wave; alternatively, a ring filter with periodic filtering characteristics for optical signals can be achieved by means of multi-beam interferometry that is utilized in optical waveguide resonant ring filters.

The tunable function of the SPPs ring filter in the present invention is mainly based on the characteristics of SPPs mode for long-distance transmission. In the SPPs waveguide, metal nanometer wires with a negative dielectric constant are utilized to form the sandwich layer, and a dielectric material with a positive electric constant is utilized to form the cladding. The metal material has a negative dielectric constant in the optical communication waveband. The part enclosed by dotted lines in the accompanying drawings indicates loss characteristic, which will cause attenuation of electromagnetic power. Severe loss will occur when the optical signals are transmitted along the transmission direction in the metal layer. To reduce the loss on metal surface and achieve SPPs mode signals for long-distance transmission, the waveguide structure must be specially designed. The thickness of metal sandwich layer is reduced to 10-15 nm; the width of the metal sandwich layer is much greater than the thickness, and is usually at micron level. The top cladding and the bottom cladding have the same dielectric constant and thickness which is usually about 15μm. With the SPPs waveguide achieved in a strictly symmetric sandwich structure, the signals in two-dimensional transmission mode on the top and bottom surfaces of the metal material can be coupled effectively, so as to achieve a SPPs mode for long-distance transmission. In this mode, the transmission of light intensity is mainly concentrated at the interface between the metal material and the dielectric material, and the ratio of the energy entering the metal material is very low; therefore, the transmission loss caused by the metal material is very low. The field distribution of resultant SPPs mode signals is similar to that of single-mode optical fibers and optical waveguides, therefore, the filter has a low insertion loss characteristic, and can be effectively integrated with optical fiber and optical waveguide devices.

Since the sandwich layer of the SPPs waveguide is made of a highly conductive metal material that can transmit both optical and electrical signals, an electrical signal circuit can be formed by introducing a special structure in the metal layer, and the transmission characteristics of an optical signal can be controlled flexibly by using an electric signal. For example, in a SPPs directional coupler, an electrical signal circuit can be formed with the metal sandwich layer and the electrode pins by introducing metal defects, a micro-heater can be formed by applying electrical signals at specific power on the electrode pins, and the refractive index of the cladding can be changed by utilizing the thermo-optical properties of the organic polymer material, so as to change the effective refractive index of SPPs mode. For a directional coupler, if the refractive index is not symmetrical between the two adjacent waveguides, mode mismatch will occur, and the coupling efficiency will be reduced; thus, the coupling ratio K will be reduced. Therefore, the coupling ratio of the directional coupler can be controlled flexibly by using the electrical signal power. The same principle also applies to resonant ring waveguides. By introducing electrical signals in the sandwich layer to change the effective refractive index in resonant ring waveguides, the transmission phase of the resonant ring will be tunable.

In addition, SPPs waveguides have a function of tunable transmission loss and can increase or decrease the transmission loss as required, which is a novel feature not available in conventional optical waveguides. The transmission loss of SPPs waveguide is directly related to energy limiting factor cf $$cf = \frac{|\iint_{A_c} S_z ds|}{|\iint_{A_\infty} S_z ds|} \quad (1)$$

In formula 1, $A_c$ is the area covered by the metal sandwich layer, $A_\infty$ is the total area of the waveguide section, and $S_z$ is energy-flux density. Where as, the energy-flux density is related with the dielectric constant of cladding, i.e., as the dielectric constant of cladding decreases, the energy-flux density decreases, represented by decrease of cf. Thus, the proportion of signal transmission energy decreases in the metal sandwich layer, and the energy absorption loss caused by the metal material decreases accordingly. Therefore, the transmission loss can be reduced by heating both the top and bottom cladding which are made of organic polymer material to reduce the dielectric constant while maintaining the symmetry characteristic of SPPs mode.

If the top cladding is heated only, the SPPs mode will not be fully symmetric and will result in a radiation mode because a refractive index difference occurs between the top cladding and the bottom cladding; as a result, energy radiation will occur and thereby cause increased transmission loss in the SPPs waveguide. The higher the heater power is, the higher the transmission loss will be. Therefore, the transmission loss in the resonant ring can be controlled flexibly by increasing a micro-heater in the top cladding and bottom cladding of the SPPs waveguide respectively.

The crucial technical indexes of the SPPs tunable ring filter in the present invention—resonance depth, resonance frequency, and filtering bandwidth—can be tuned as follows:

1. Method for tuning resonance depth: The relative light intensity output if the SPPs ring filter meets:

$$|E_{out}/E_{in}|^2 = \frac{(1-\gamma)K}{1 + A - 2A^{1/2}\cos\beta L} \quad (2)$$

In formula 2, $\gamma$ and A are loss coefficients in the ring, $\beta$ is the phase propagation constant of the waveguide, and L is the perimeter of the resonant ring. K is the coupling ratio of the directional coupler (2). The resonance depth (minimum output light intensity) is in a mapping relation with the coupling ratio K, and if the following formula is met:

$$K = K_r = 1 - (1-\gamma)\exp(-\alpha L) \quad (3)$$

If the resonance depth of the filter is the maximum value, $K_r$ is the optimum coupling ratio, and $\alpha$ is the wave guide transmission loss.

Thus, continuous tuning of resonance depth can be realized for the filter by utilizing electrical signals to tune the coupling ratio K of the SPPs directional coupler (2).

2. Method for tuning resonance frequency: The resonance frequency of the SPPs ring filter meets:

$$f_r = \frac{Nc}{n_{eff}L} \ (N = 1, 2, 3 \dots) \quad (4)$$

In formula 4, c is the velocity of light in vacuum, and $n_{eff}$ is effective refractive index in SPPs mode.

When electrical signals are applied in the metal sandwich layer, the effective refractive index in SPPs mode changes due to the thermo-optical effect of the polymeric material, so that the resonance frequency is tunable.

3. Method for tuning filtering bandwidth: The filtering bandwidth of the SPPs ring filter meets:

$$\delta f_{1/2} = \frac{2c}{n_{eff}\pi L}\sin^{-1}\left(\frac{1-\sqrt{1-K}\gamma\exp(-\alpha L)}{\sqrt{2[1+(1-K)\exp(-2\alpha L)]}}\right) \quad (5)$$

It can be seen from formula 5 that the filtering bandwidth is directly proportional to the intra-ring transmission loss α, which is to say, the lower the transmission loss is, the narrower the filtering bandwidth will be; the higher the transmission loss is, the wider the filtering bandwidth will be. Therefore, the filtering bandwidth of the filter can be tuned by controlling the ring heater that heats the resonant ring waveguide by means of electrical signals at certain power.

The SPPs tunable ring filter provided in the present invention is produced as follows: produce polymer dielectric films in thickness of 15μm as top cladding and bottom cladding on a silicone substrate by spin coating, and grow the metal films by thermal evaporation or magnetron sputtering to thickness of 10-20 nm. Treat the metal films through a lithographic stripping process to produce metal nanometer wires in specific structures, to form SPPs waveguide (1) SPPs directional coupler (2) SPPs resonant ring (3) so as to obtain a SPPs tunable optical resonant ring filter. The modulating electrodes are produced as follows: produce a metal strip carrier layer in the bottom cladding through a lithographic stripping process, by coating a chromium metal layer in thickness of 20 nm by vaporization first and then coating an aurum layer in thickness of 200 nm by vaporization. After the top cladding is formed by spin coating, produce a metal strip carrier layer in the top cladding in the same way, by coating a chromium metal layer in thickness of 20 nm by vaporization first and then coating an aurum layer in thickness of 200 nm by vaporization. In the process of electrode production, alignment process is repeatedly required, to ensure the nanometer metal wire sandwich layer, metal strip carrier layer in top cladding, and metal strip carrier layer in bottom cladding are in parallel to each other.

Beneficial effects: compared to the prior art, the present invention has the following advantages:

1. As a novel integrated optical filter, the SPPs waveguide tunable ring filter provided in the present invention can accurately tune and control the crucial technical indexes of filter-resonance depth, resonance frequency, and filtering bandwidth at the same time, while conventional integrated optical waveguide ring filters can not control the three indexes at the same time by means of a single device, for the optical waveguide can not control the loss in both directions.

2. The present invention replaces optical waveguide with SPPs waveguide to achieve a periodic optical signal filtering function. The metal waveguide structure can transmit both optical signals and electrical signals, and can modulate the optical signals by means of the electrical signals flexibly. Compared to optical waveguide devices, metal waveguide devices have advantages such as a simple production process and high stability.

3. Since the metal sandwich layer in the SPPs waveguide can achieve electro-optical signal multiplexing function, the SPPs waveguide-based tunable ring filter provided in the present invention can meet the demand for interconnection between integrated optical devices and more sophisticated integrated circuits; therefore, the SPPs waveguide-based tunable ring filter can not only be applied in integrated optical systems but also be widely applied in integrated photoelectric hybrid systems.

| BRIEF DESCRIPTION OF THE SYMBOLS | | | |
|---|---|---|---|
| 1 | SPPs waveguide | 12 | Top cladding |
| 13 | Bottom cladding | 14 | Metal nanometer wire |
| 15 | Upper metal strip carrier layer | 16 | Lower metal strip carrier layer |
| 17 | Straight metal wire gap | 2 | Coupler |
| 21 | First electrode pin | 3 | Resonant ring |
| 31 | Ring heater | 32 | Second electrode pin |
| 33 | Third electrode pin | 34 | Fourth electrode pin |
| 35 | Arc metal wire gap | | |

DETAILED DESCRIPTION OF THE EMBODIMENTS

Hereunder the technical solution of the present invention will be further detailed with reference to the accompanying drawings.

The SPPs waveguide tunable ring filter provided in the present invention utilizes a metal SPPs waveguide as the transmission circuit and utilizes multi-beam interference principles to achieve a filter function. Metal strip borne heaters are added in the SPPs waveguide or top and bottom claddings, and the parameters such as waveguide transmission mode and transmission loss are regulated by means of electrical signals, to achieve accurate tuning and control of resonance depth, resonance frequency and filtering bandwidth.

Figure 1:
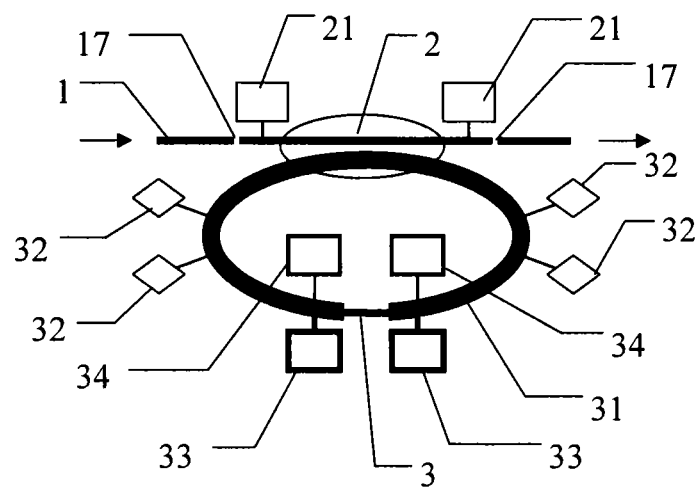
FIG. 1 is a schematic structural diagram of the SPPs tunable optical resonant ring filter provided in the present invention.
Figure 2:
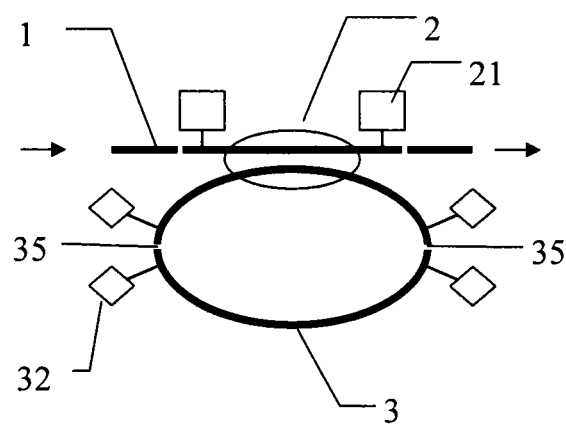
FIG. 2 is a schematic structural diagram of the SPPs tunable optical resonant ring filter without a ring heater provided in the present invention.

The structure of the SPPs waveguide-based tunable ring filter provided in the present invention is shown in FIG. 1 and FIG. 2. FIG. 1 is a schematic structural diagram of the SPPs waveguide ring filter. The filter utilizes SPPs waveguide 1 as the medium for signal transmission, and comprises SPPs directional coupler 2 and SPPs resonant ring 3. To achieve the function of electrical signal modulation, electrode pins are introduced in the structure of directional coupler and the structure of resonant ring respectively.

To tune the loss in the curved waveguide of the resonant ring, a metal ring heater 31 is introduced in the top cladding and bottom cladding of waveguide in the resonant ring, respectively. The ring heaters are split metal rings, and the third electrode pin 33 of the top cladding is not in the same plane as the fourth metal pin 34 of the bottom cladding. Such a structure can ensure the electrical signals can be fed into different heaters from the top of the device, and form efficient circuits.

The structure of SPPs resonant ring 3 without being covered by ring heaters is shown in FIG. 2. Wherein, the metal wire gaps 35 and second electrode pin 32 are for the same purpose as those shown in FIG. 5, and will be introduced together with reference to FIG. 5.

Figure 3:
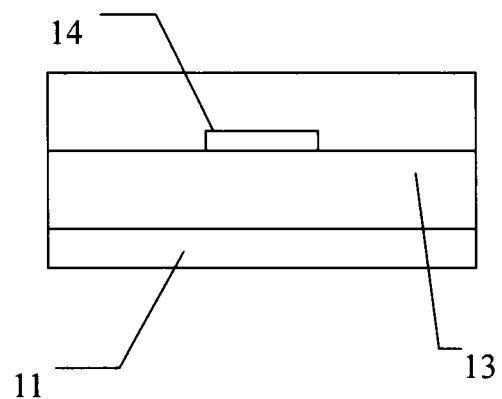
FIG. 3 is a schematic diagram of the cross-section structure of a SPPs waveguide in the transmission direction.

The structure of SPPs waveguide is shown in FIG. 3. To achieve a wide refractive index regulation range and long-distance transmission, fluorinated polyimide or ultraviolet curing adhesive with low refractive index, low absorption loss, and high thermo-optical coefficient, or a polymeric material with similar properties, is selected for the cladding material. A highly conductive metal material, such as aurum, silver, copper, or aluminum, is selected for the material of sandwich layer. The substrate 11 is a polished silicon wafer or quartz wafer, and the top cladding 12 and bottom cladding 13 are in the same thickness greater than 15µm. The metal nanometer wire sandwich layer 14 has a rectangular cross section, in width of 1-8 µm and thickness of 15 nm.

Figure 4:
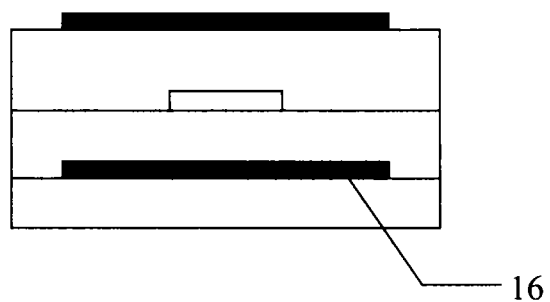
FIG. 4 is a schematic diagram of the cross-section structure of a SPPs waveguide that is a part of the SPPs structural ring in the transmission direction.

A ring heater is added in the top and bottom cladding of the curved waveguide that is a part of the SPPs resonant ring. The cross sectional structure of the waveguide is shown in FIG. 4. The top and bottom cladding are top metal strip carrier layer 15 and bottom metal strip carrier layer 16 produced by coating through a thermal evaporation or magnetron sputtering process, and the metal strip carrier layers are in width slightly greater than the width of nanometer metal wire 14 and in height of about 200 nm.

Figure 5:
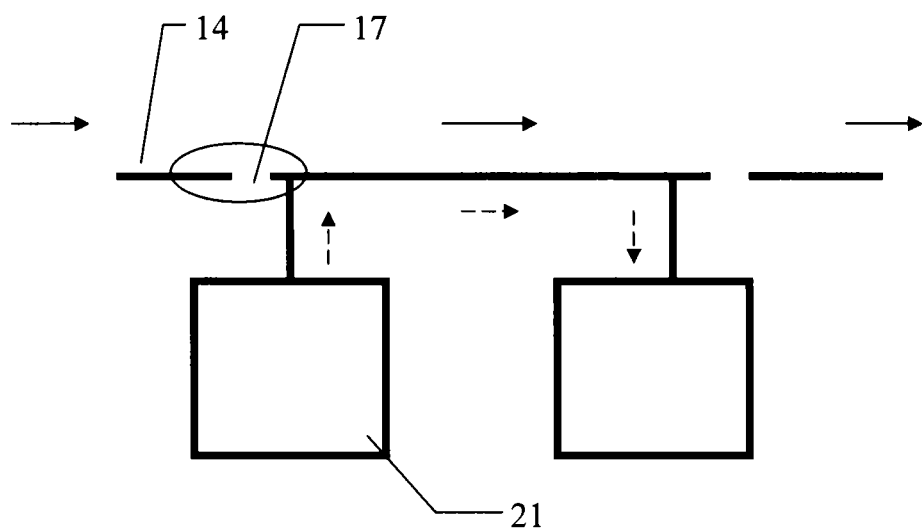
FIG. 5 is a schematic diagram of detailed structure of a SPPs tunable directional coupler and transmission of optical and electrical signals.

FIG. 5 is a schematic diagram of the signal transmission circuit of SPPs waveguide multiplexed electro-optical signals. Take the tunable directional coupler structure for example, metal wire gaps 17 at about 1-5 µm interval are introduced in the metal nanometer wires 14. Since SPPs mode signals can pass a SPPs waveguide structure with small gaps without loss, the SPPs mode signals are transmitted in the direction indicated by the solid arrow. Electric al signals are fed through the second electrode pin 21 into the metal nanometer wires 14, and form a loop under the effect of the metal wire gaps 17. Therefore, the transmission path of electrical signals is indicated by the dotted arrow. By changing the refractive index of cladding medium around the metal wires with electrical signal input and thereby changing the propagation constant of the directional coupler, the coupling ratio can be controlled. The variation of coupling ratio depends on the power of the electrical signals.

Figure 6:
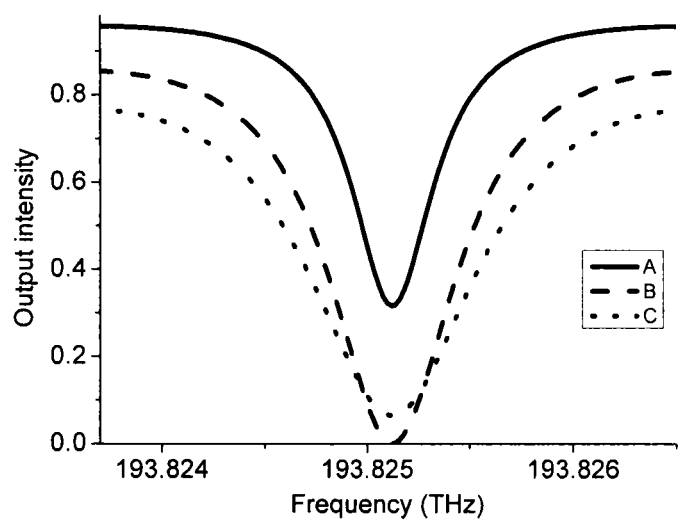
FIG. 6 shows the relation curve of filter output signals vs. coupling ratio K. The three curves A, B, C correspond to the transmissive spectral lines of the filter at coupling ratios $K<K_r$, $K=K_r$, $K>K_r$, respectively.

The resonance depth is tuned as follows:

The transmissive spectral lines at different resonance depths are shown in FIG. 6. It can be seen from formula 2: the coupling ratio K of directional coupler 2 decides the resonance depth of the output signals. Set the initial coupling ratio K of the coupler to be K>$K_r$. Here, the resonant ring is in an overcoupled state, and the resonance depth is small (curve C). As electrical signals are applied on the second electrode pin 21 of the directional coupler, the coupling ratio K will decrease gradually, and the resonance depth will increase gradually, till the optimal coupling state is reached finally. Here, the coupling ratio K is K=$K_r$ (curve B). As the electrical signal is further increased, the resonance depth decreases gradually. Here, the corresponding state is an undercoupled state, and the coupling ratio K is K<$K_r$ (curve A).

Figure 7:
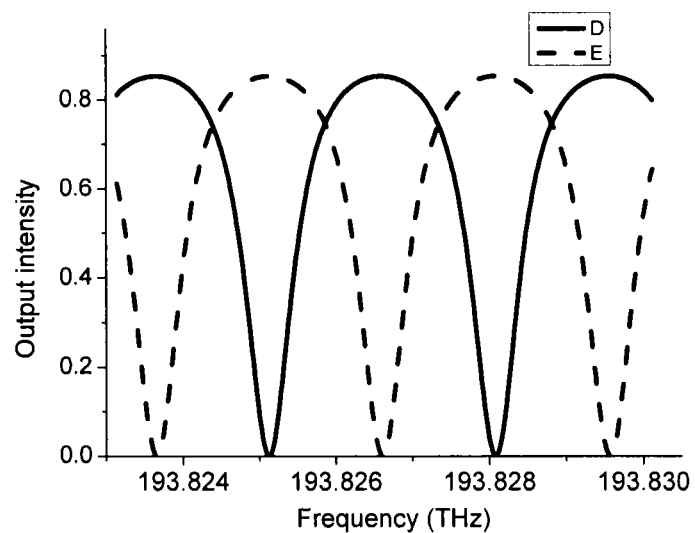
FIG. 7 shows the effects of resonance frequency shifts under electrical signals at different power values.

The resonant frequency is tuned as follows:

The resonant frequency of the filter can be determined with formula 4. After the initial transmission phase of the resonant ring is determined, a series of resonant frequencies can be determined. The effective refractive index $N_{eff}$ of the SPPs waveguide can be changed by applying electrical signals in the metal nanometer wire sandwich layer of the resonant ring to tune the resonant frequency and achieve accurate control and selection. The curves in FIG. 7 indicate that the transmissive spectral lines of resonance at different electrical signal power values have different resonant frequencies.

Figure 8:
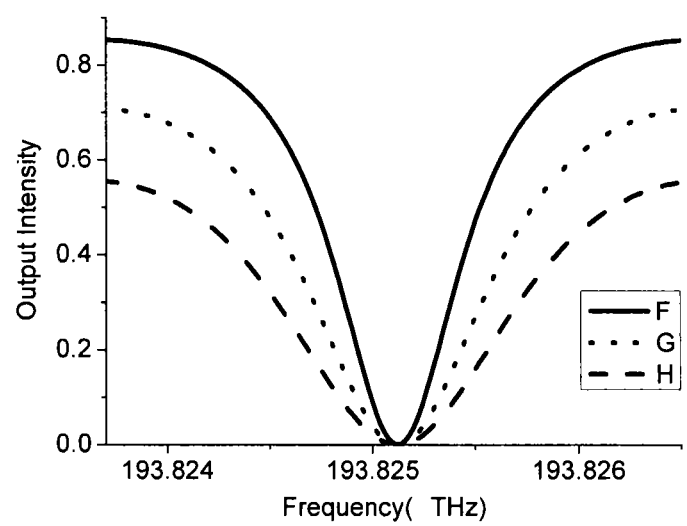
FIG. 8 shows a curve of filtering width vs. transmission loss.

The filtering bandwidth is tuned as follows:

After the filter device is produced, the waveguide of the resonant ring has an initial loss coefficient. The corresponding resonance bandwidth can be expressed with formula 5. When electrical signals are fed into the ring heater in the top cladding, the heater begins to heat the cladding. Since there is a temperature gradient difference between the top and bottom cladding, the symmetry of SPPs mode is affected, thus the transmission loss in the resonant ring is increased. The amplification of loss is directly proportional to the electrical signal power. At the same time, the coupling ratio of the directional coupler can be tuned to set the resonance depth to be the optimal coupling state. When the heaters in the top and bottom claddings work at the same time, the refractive indexes of the claddings will decrease while the SPPs mode is still kept symmetric, since the polymeric material of the claddings has thermo-optical characteristic. With an appropriate optical polymeric material with high thermo-optical performance (thermo-optical coefficient is more than $-3.0 \times 10^{-4}$) and high vitrification point, the refractive indexes of the claddings can be greatly decreased by means of the ring heaters, so that the ratio of SPPs signal transmission power in the metal sandwich layer (determined from formula 1) can be decreased, and thereby the transmission loss in the resonant ring and the filtering bandwidth can be decreased. The filtering widths at different transmission loss values are shown in FIG. 8.

The invention claimed is:

1. An SPPs tunable optical resonant ring filter, comprising:
an SPPs straight waveguide,
an SPPs tunable directional coupler,
an SPPs tunable resonant ring, and
a ring heater;
wherein the resonant ring and the straight waveguide outside of the ring form the coupler; the coupler and resonant ring are made of polymer-metal-polymer SPPs waveguides;
gaps between segments of a straight metal wire are disposed symmetrically on the straight SPPs waveguides and gaps between segments of a curved metal wire are disposed symmetrically on the resonant ring; the ring heater comprises two portions disposed symmetrically on an upper surface and a bottom surface of the resonant ring respectively; and further wherein a first electrode pin is connected to the straight metal wire of the SPPs straight waveguide, a second electrode pin is connected to the curved metal wire of the resonant ring, the metal wires of the polymer-metal-polymer SPPs waveguides are used simultaneously as waveguide and heating elements, and a third electrode pin and a fourth electrode pin are connected to the ring heater.

2. The SPPs tunable optical resonant ring filter according to claim 1, wherein the polymer-metal-polymer SPPs waveguides each comprise a sandwich layer including a metal nanometer wire having a thickness of 10-20 nm and a width of 1-8 μm; a top cladding and a bottom cladding made of an organic polymer dielectric material with a thermo-optical coefficient greater than $-3.0 \times 10^{-4}$ $C^{-1}$ and having a same thickness of 15μm.

3. The SPPs tunable optical resonant ring filter according to claim 2, wherein the SPPs tunable directional coupler, the first electrode pin and the gaps between the straight metal wire segments are produced in the sandwich layer to form an electrical signal transmission circuit.

4. The SPPs tunable optical resonant ring filter according to claim 2, wherein the SPPs tunable resonant ring, the second electrode pin and the gaps between the curved metal wire segments are produced in the sandwich layer to form an electrical signal transmission circuit.

5. The SPPs tunable optical resonant ring filter according to claim 2, wherein the ring heater covers the resonant ring and consists of an upper metal strip carrier layer and a lower metal strip carrier layer disposed on an outer side of the top cladding and the bottom cladding respectively, in a metal split ring structure, and the third electrode pin in the top cladding is not in the same plane as the fourth electrode pin in the bottom cladding.

* * * * *